United States Patent
Wright et al.

(10) Patent No.: US 6,587,117 B1
(45) Date of Patent: Jul. 1, 2003

(54) APPARATUS AND METHOD FOR ADAPTIVE TRANSFORMATION OF FRACTIONAL PIXEL COORDINATES FOR CALCULATING COLOR VALUES

(75) Inventors: Burton Wright, Sunnyvale, CA (US); Lesley Borbely-Bartis, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 368 days.

(21) Appl. No.: 09/607,757

(22) Filed: Jun. 29, 2000

(51) Int. Cl.[7] .................................................. G09G 5/02
(52) U.S. Cl. ...................... 345/601; 345/501; 345/602; 345/606
(58) Field of Search .............................. 345/602, 601, 345/606

(56) References Cited

U.S. PATENT DOCUMENTS

| | | | | |
|---|---|---|---|---|
| 5,420,979 A | * | 5/1995 | Madden et al. ............. | 345/501 |
| 5,835,099 A | | 11/1998 | Marimont ................... | 345/431 |
| 5,850,471 A | * | 12/1998 | Brett .......................... | 382/162 |
| 5,896,122 A | * | 4/1999 | MacDonald et al. ........ | 345/602 |
| 6,002,795 A | * | 12/1999 | Eames et al. ............... | 382/167 |
| 6,157,749 A | * | 12/2000 | Miyake ....................... | 382/300 |
| 6,157,937 A | | 12/2000 | Wakasugi ................... | 708/290 |
| 6,259,427 B1 | | 7/2001 | Martin et al. ............... | 345/137 |
| 6,313,840 B1 | * | 11/2001 | Bilodeau et al. ............ | 345/423 |
| 6,476,810 B1 | * | 11/2002 | Simha et al. ............... | 345/424 |

OTHER PUBLICATIONS

Foley, J. et al., "Second Edition In C Computer Graphics Principles and Practice", Addison–Wesley Publishing Company, Reading, Massachusetts, 1996, pp. 132–140, 619–623.

* cited by examiner

Primary Examiner—Matthew C. Bella
Assistant Examiner—Mike Rahmjoo
(74) Attorney, Agent, or Firm—Dorsey & Whitney LLP

(57) ABSTRACT

A system and method for adaptive interpolation of a color value for a destination pixel from color values of adjacent source pixels and the destination pixel's coordinate values. An adaptive color value interpolation circuit includes look-up-tables (LUTs) to store a plurality of values for each of the destination pixel's coordinates. Each of the LUTs provide to an interpolation circuit a selected one of the plurality of stored values in the LUTs according to the respective coordinate value. The interpolation circuit also receives the color values of the adjacent pixels. The interpolation circuit calculates the pixel's interpolated color value by weighting the color values of the adjacent pixels according to the selected values from the first and second LUTs. Instead of determining the pixel's color value by directly applying the destination pixel's coordinate values in the color weighting calculation, the pixel's color value is determined from weighting the source pixels' color values according to the stored values provided by the LUTs. Consequently, various interpolation functions may be simulated by the adaptive interpolation circuit by programming the appropriate values in the LUTs for the pixel's respective coordinates.

64 Claims, 4 Drawing Sheets

APPARATUS AND METHOD FOR ADAPTIVE TRANSFORMATION OF FRACTIONAL PIXEL COORDINATES FOR CALCULATING COLOR VALUES

TECHNICAL FIELD

The present invention is related generally to the field of computer graphics, and more particularly, to calculating color values in a computer graphics processing system through adaptive transformation of fractional pixel coordinates.

BACKGROUND OF THE INVENTION

In two-dimensional ("2D") graphics, scaling is an important feature. Scaling is the ability to increase or decrease the size of an image. The scaling feature has many uses, such as editing graphic images, decreasing the size of an image so that the entire image fits on a screen, or increasing the image size for easy viewing of image detail. However, when scaling an image, the quality of the image is often degraded. For example, where an image is enlarged, the image resolution decreases and the result is that curves and lines that appeared smooth in the original image appear jagged and pixilated in the enlarged image.

A conventional approach to improving the image quality of a scaled image is the use of bilinear interpolation. Shown in FIG. 1 is a conventional bilinear interpolation circuit 10. In conventional applications of bilinear interpolation for image scaling, the color value Cp of a destination pixel in the enlarged image is calculated from weighting the color values Ct0–Ct3 of the closest four adjacent source pixels of the original image. The weighting is based on the destination pixel's coordinates, or fractional coordinates (rU, rV). Thus, in the case where an image is being enlarged, the transition from one color to another in the enlarged image appears more uniform and smooth because the color value for the destination pixels are dependent on the color values of the adjacent source pixel colors in the original image. The resulting enlarged image maintains an acceptable image quality.

Although bilinear interpolation works well for images where color transitions from one pixel to another is relatively gradual, problems occur where the color transition from one pixel to another is dramatic, for example, in the case of dark colored text on a light colored background. When bilinear interpolation is applied to images where the color gradient is severe, the resulting enlarged image appears "fuzzy" because the pixels along the edge of the enlarged image have a color value that is an interpolated value of the light background and the dark text. In the typical case, where the text is black and the background is white, these pixels appear gray, causing the enlarged image to lose some of its sharpness.

Bicubic interpolation has been used to maintain the image quality of an enlarged image. Bicubic interpolation calculates the color value of a pixel in the enlarged image from the color value of the closest four pixels along one coordinate using a cubic function to weight the color values. Calculations are performed along each of the u and v coordinates, and as a result, the color value of the destination pixel is influenced by sixteen (4×4) adjacent source pixels. The resulting enlarged image results in a more natural appearance, and consequently, enlarged images do maintain an acceptable level of sharpness.

Although using bicubic interpolation for scaling operations is an improvement over the use of bilinear interpolation, bicubic interpolation may cause "ringing" artifacts in the enlarged image, especially near sharp edges in the source content, for example, text. Moreover, the improvement in image quality of the enlarged image resulting from applying bicubic interpolation comes at the price of space overhead. A circuit that performs bicubic interpolation is considerably more complicated and requires more space on a semiconductor die than a circuit performing bilinear interpolation. Thus, although using bicubic interpolation for scaling operations results in good image quality, the cost is increased circuit complexity and reduction of space overhead. Where high circuit integration, or a reduction in overall circuit size is desired, including a circuit capable of performing bicubic interpolation may not be acceptable.

Therefore, there is a need for a system and method for scaling graphics images that results in acceptable image quality while addressing the space overhead concerns of conventional scaling circuitry employing bicubic interpolation.

SUMMARY OF THE INVENTION

The present invention is directed toward an adaptive interpolation circuit and method for calculating an interpolated color value for a pixel from color values of adjacent pixels. The adaptive interpolation circuit includes first and second look-up-tables (LUTs) to store a plurality of values. Each of the LUTs has a selection circuit that receives an index value corresponding to a respective coordinate value of the pixel and selects one of the stored values to provide to an interpolation circuit according to the received index value. In addition to receiving a selected value from each LUT, the interpolation circuit also has color input terminals to receive the color values of the adjacent pixels. The interpolation circuit calculates the pixel's interpolated color value by weighting the color values of the adjacent pixels according to the selected values provided by the first and second LUT. Thus, rather than determining the pixel's color value from directly applying the pixel's relative coordinate values in the color weighting calculation, the pixel's color value is determined from weighting the selected values provided to the interpolation circuit by the LUTs. Consequently, various interpolation functions may be simulated by the adaptive interpolation circuit by programming the appropriate values in the LUTs for the pixel's relative coordinates.

DETAILED DESCRIPTION OF THE INVENTION

Embodiments of the present invention provide an adaptable scaling method and circuit that may be programmed to simulate various interpolation functions when calculating the color value of a source pixel. Certain details are set forth below to provide a sufficient understanding of the invention.

However, it will be clear to one skilled in the art that the invention may be practiced without these particular details. In other instances, well-known circuits, control signals, timing protocols, and software operations have not been shown in detail in order to avoid unnecessarily obscuring the invention.

Figure 2:
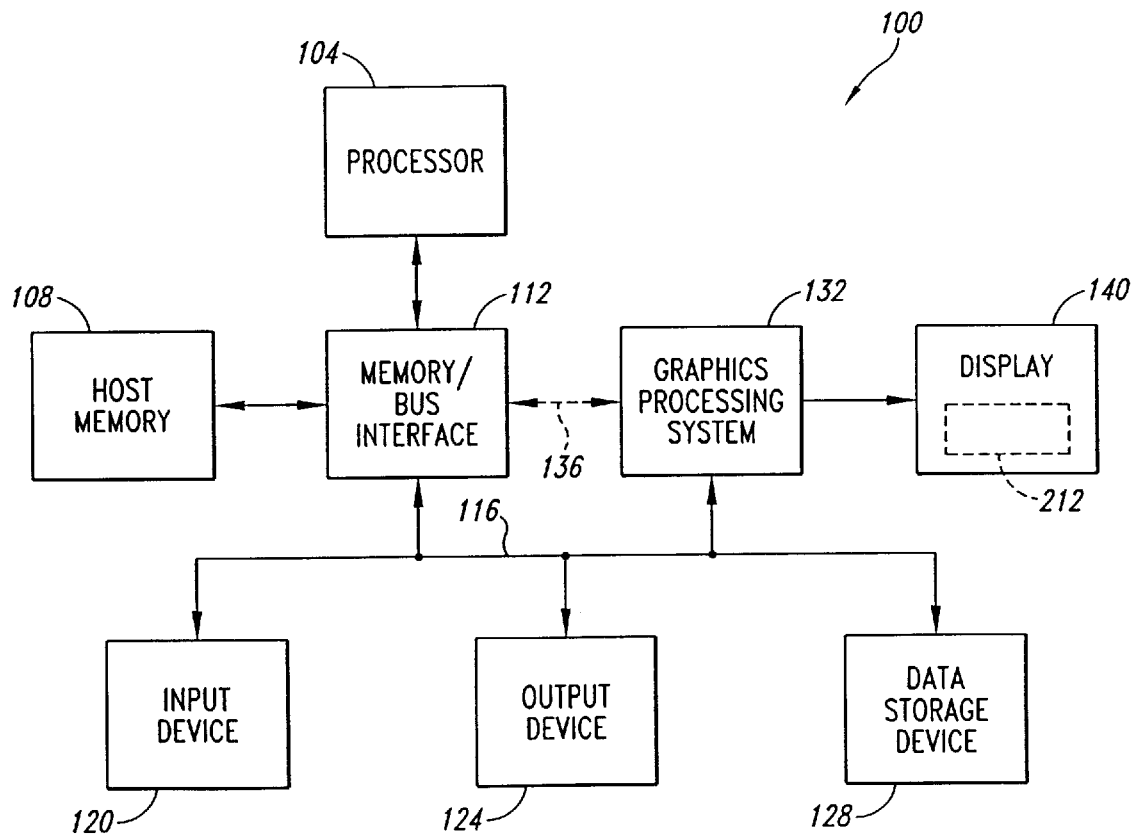
FIG. 2 is a block diagram of a computer system in which embodiments of the present invention are implemented.

FIG. 2 illustrates a computer system 100 in which embodiments of the present invention are implemented. The computer system 100 includes a processor 104 coupled to a host memory 108 through a memory/bus interface 112. The memory/bus interface 112 is coupled to an expansion bus 116, such as an industry standard architecture (ISA) bus or a peripheral component interconnect (PCI) bus. The computer system 100 also includes one or more input devices 120, such as a keypad or a mouse, coupled to the processor 104 through the expansion bus 116 and the memory/bus interface 112. The input devices 120 allow an operator or an electronic device to input data to the computer system 100. One or more output devices 120 are coupled to the processor 104 to provide output data generated by the processor 104. The output devices 124 are coupled to the processor 104 through the expansion bus 116 and memory/bus interface 112. Examples of output devices 124 include printers and a sound card driving audio speakers. One or more data storage devices 128 are coupled to the processor 104 through the memory/bus interface 112 and the expansion bus 116 to store data in, or retrieve data from, storage media (not shown). Examples of storage devices 128 and storage media include fixed disk drives, floppy disk drives, tape cassettes and compact-disc read-only memory drives.

The computer system 100 further includes a graphics processing system 132 coupled to the processor 104 through the expansion bus 116 and memory/bus interface 112. Optionally, the graphics processing system 132 may be coupled to the processor 104 and the host memory 108 through other types of architectures. For example, the graphics processing system 132 may be coupled through the memory/bus interface 112 and a high speed bus 136, such as an accelerated graphics port (AGP), to provide the graphics processing system 132 with direct memory access (DMA) to the host memory 108. That is, the high speed bus 136 and memory bus interface 112 allow the graphics processing system 132 to read and write host memory 108 without the intervention of the processor 104. Thus, data may be transferred to, and from, the host memory 108 at transfer rates much greater than over the expansion bus 116. A display 140 is coupled to the graphics processing system 132 to display graphics images. The display 140 may be any type of display, such as a cathode ray tube (CRT), a field emission display (FED), a liquid crystal display (LCD), or the like, which are commonly used for desktop computers, portable computers, and workstation or server applications. As will be explained in more detail below, a scaling circuit 212 may be included in the display 140 to perform scaling operations on graphics images prior to rendering.

Figure 3:
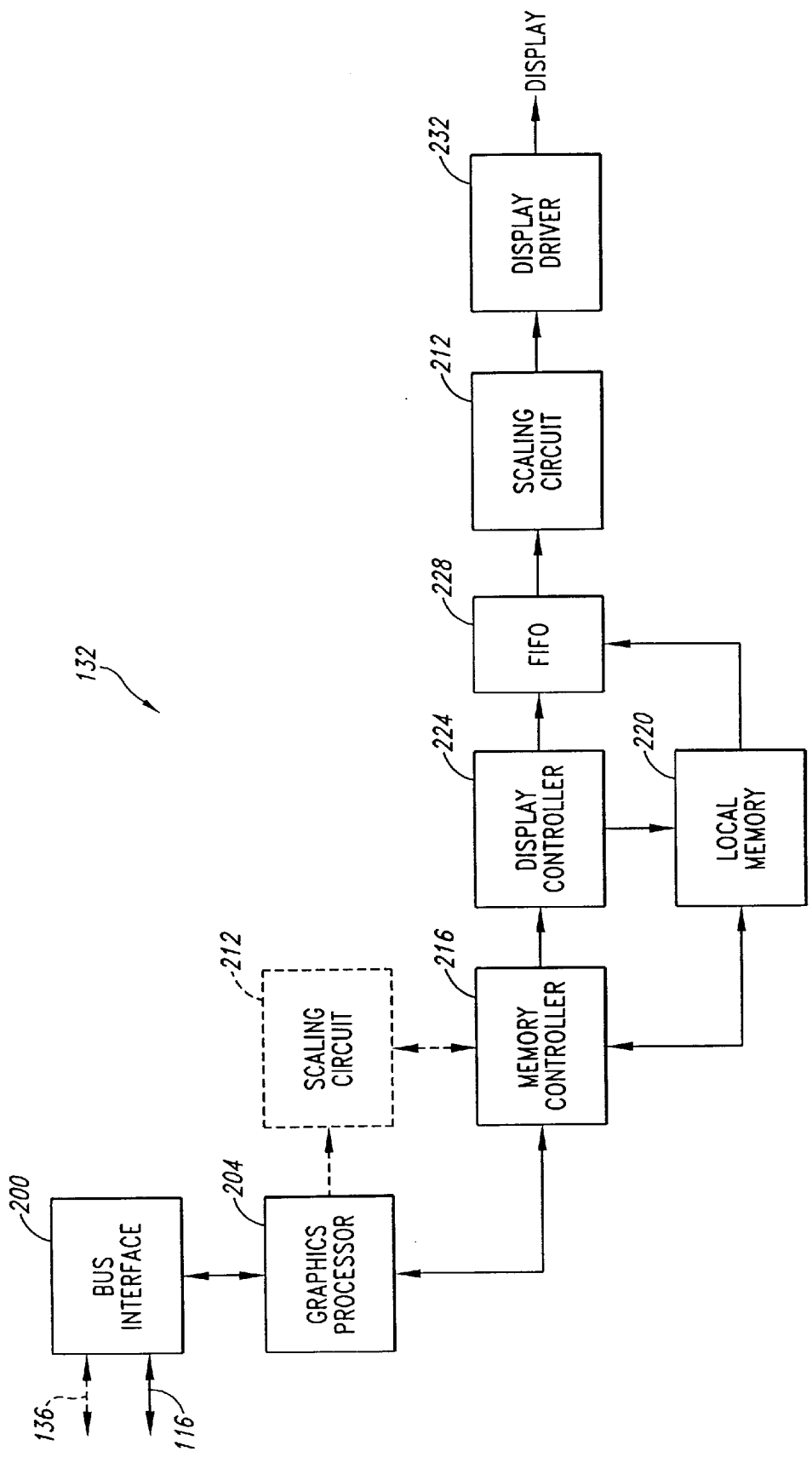
FIG. 3 is a block diagram of a graphics processing system in the computer system of FIG. 2.

FIG. 3 illustrates circuitry included within the graphics processing system 132 for performing various graphics functions. As shown in FIG. 3, a bus interface 200 couples the graphics processing system 132 to the expansion bus 116. In the case where the graphics processing system 132 is coupled to the processor 104 and the host memory 108 through the high speed data bus 136 and the memory/bus interface 112, the bus interface 200 will include a DMA controller (not shown) to coordinate transfer of data to and from the host memory 108 and the processor 104. A graphics processor 204 is coupled to the bus interface 200 and is designed to perform various graphics and video processing functions. A memory controller 216 coupled to the graphics processor 204 handles memory requests to and from a local memory 220. The local memory 220 stores graphics data, such as source pixel color values and destination pixel color values. A display controller 224 coupled to the local memory 220 and to a first-in first-out (FIFO) buffer 228 controls the transfer of destination color values to the FIFO 228. Destination color values stored in the FIFO 336 are provided to a scaling circuit 212 that facilitates resizing or rescaling graphics images. As will be explained below, the scaling circuit 212 may be programmed so that the transformations performed during a scaling operation of graphics images are adaptable. A display driver 232 coupled to the output of the scaling circuit 212 includes circuitry to provide digital color signals, or convert digital color signals to red, green, and blue analog color signals, to drive the display 140 (FIG. 2).

Although the scaling circuit 212 is illustrated in FIG. 3 as being a separate circuit, it will be appreciated that the scaling circuit may be included in one of the aforementioned circuit blocks of the graphics processing system 132. For example, the scaling circuit 212 may be included in the graphics processor 204 or the display controller 224. In other embodiments, the scaling circuit 212 may be included in the display 140 (FIG. 2) coupled to a dedicated FIFO and processor (not shown). It will be further appreciated that the scaling circuit 212 may be relocated in FIG. 3 to an alternative location, such as coupled between the graphics processor 204 and the memory controller 216 without losing any functionality. Therefore, the particular location of the scaling circuit 212 is a detail that may be modified without deviating from the subject matter of the invention, and should not be used in limiting the scope of the present invention.

Figure 1:
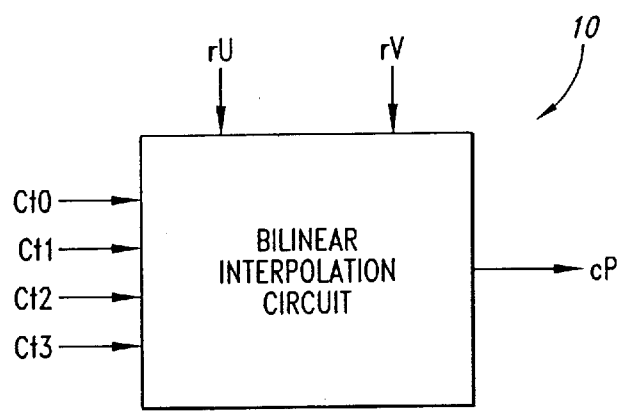
FIG. 1 is a block diagram of a conventional bilinear interpolation circuit.
Figure 4:
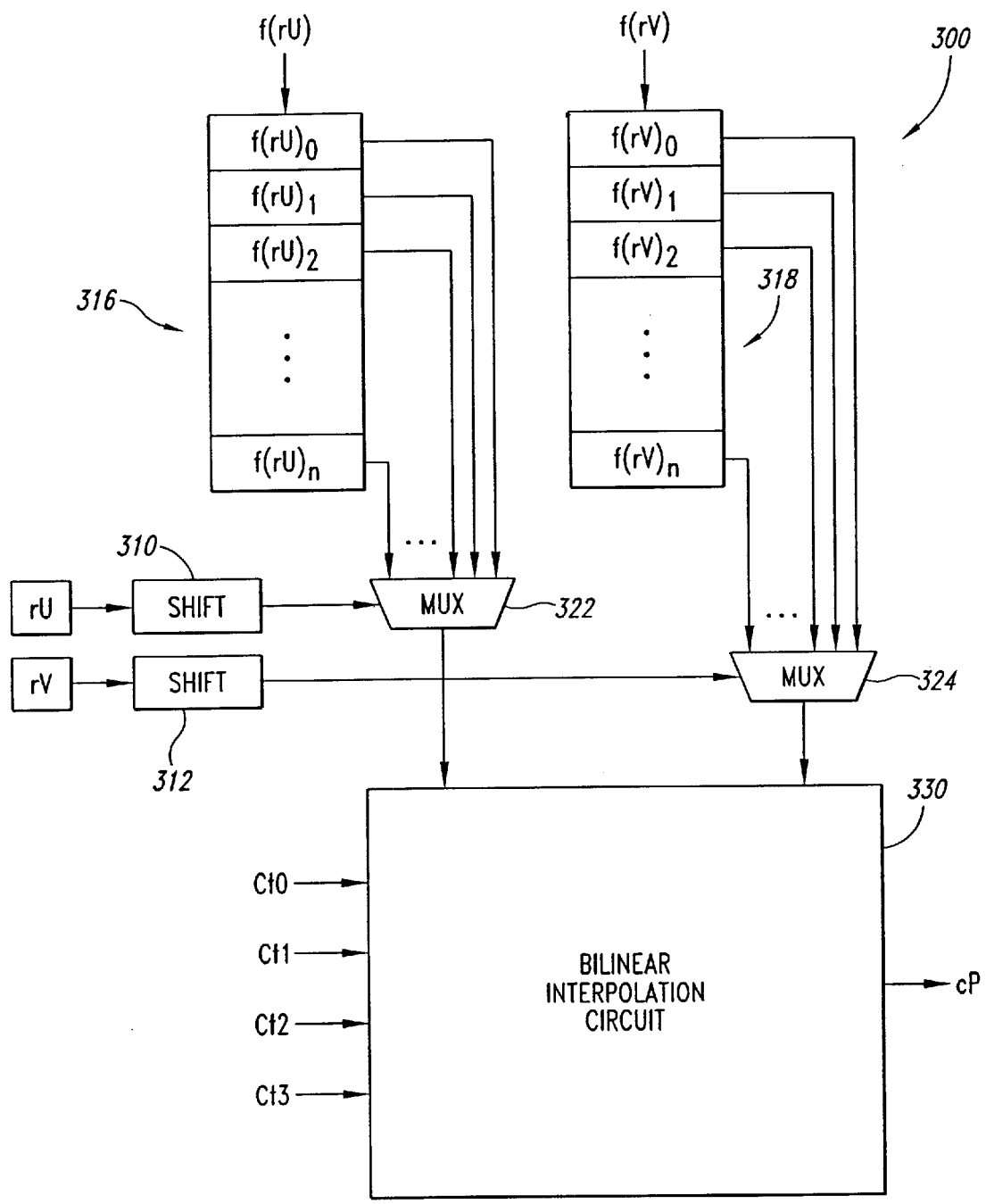
FIG. 4 is a block diagram of a scaling circuit according to an embodiment of the present invention.

Shown in FIG. 4 is an embodiment of a scaling circuit 300 that may be substituted for the scaling circuit 212 of FIG. 3. The scaling circuit 300 includes a conventional bilinear interpolation circuit 330 that is similar to the bilinear interpolation circuit 10 of FIG. 1. The bilinear interpolation circuit 330 determines the color value Cp for a destination pixel located in a two dimensional coordinate system by weighting color values of the four adjacent source pixels Ct0–Ct3 according to the destination pixel's coordinates (U, V), or the destinations pixel's fractional coordinates (rU, rV). It will be appreciated by those of ordinary skill in the art that the color of the destination pixel Cp and the color of the four adjacent source pixels Ct0–Ct3 typically consist of several color components. For example, the destination pixel color Cp and the source pixel colors Ct0–Ct3 may be the combination of red, green, and blue color components. Consequently, as it is well known in the art that the bilinear interpolation circuit 330 includes circuitry to perform bilinear interpolation for each of the color components although the circuitry is not shown in FIG. 4. The bilinear interpolation circuit 330 calculates the destination pixel's color by applying the following equation:

$$Cp = \text{Weight } t0 \cdot Ct0 + \text{Weight } t1 \cdot Ct1 + \text{Weight } t2 \cdot Ct2 + \text{Weight } t3 \cdot Ct3$$

where:

$$\text{Weight } t0 = (1-rU) \cdot (1-rV); \text{ Weight } t1 = rU \cdot (1-rV);$$

$$\text{Weight } t2 = (1-rU) \cdot rV; \text{ and Weight } t3 = rU \cdot rV$$

Qualitatively, a source pixel's color value is given more weight in the destination pixel's calculated color value Cp when the destination pixel's position is biased toward the source pixel.

In addition to the conventional bilinear interpolation circuit 330, the scaling circuit 300 further includes two look-up tables (LUTs) 316 and 318 and two multiplexers 322 and 324. A LUT-multiplexer pair is assigned to each coordinate of the destination pixel. Values stored in the LUTs 316 and 318 are provided to the multiplexers 322 and 324, respectively. The destination pixel's coordinates (U, V), or fractional coordinates (rU, rV) are provided to the multiplexers 322 and 324, respectively, as indices to select which of the values stored in the LUTs 316 and 318 are provided to the bilinear interpolation circuit 330 for calculation of the destination pixel's color value. The LUTs 316 and 318 may be programmed by a graphics application executing on the graphics processor 204 (FIG. 3) or the processor 104 (FIG. 2). Alternatively, the LUTs 316 and 318 may be programmed by a dedicated processor or dedicated circuitry (not shown) where the scaling circuit 300 resides in the display 140 (FIG. 2), or between the FIFO 228 and the display driver 232 (FIG. 3). Thus, rather than determining the destination pixel's color value Cp by directly applying the destination pixel's relative coordinate values in the color weighting calculation, the destination pixel's color value is instead determined from weighting values programmed in and provided from the LUTs 316 and 318. Selection of the values provided to the bilinear interpolation block are determined by the relative coordinates of the destination pixel. That is, the coordinates of the destination pixel are used as indices into the respective LUTs 316 and 318. Consequently, the resulting color value Cp for the destination pixel, is determined from the following equation:

$Cp$=Weight $t0 \cdot Ct0$+Weight $t1 \cdot Ct1$+Weight $t2 \cdot Ct2$+Weight $t3 \cdot Ct3$ where:

Weight $t0=(1-f(rU)) \cdot (1-f(rV))$; Weight $t1=f(rU) \cdot (1-f(rV))$;

Weight $t2=(1-f(rU)) \cdot f(rV)$; and Weight $t3=f(rU) \cdot f(rV)$

As mentioned previously, the color value Cp of the destination pixel is based on a functional result of the pixel's relative coordinates, rather than directly on the pixel's relative coordinates.

The scaling circuit 300 can be adapted to perform various interpolation functions by programming the appropriate values in the LUTs 316 and 318, and providing the values to the bilinear interpolation block 330 for calculating the destination pixel's color value Cp. For example, the scaling circuit 300 may be used to calculate destination pixel color values that simulate a bicubic interpolation function, but without the costs associated with the conventional approach of implementing bicubic interpolation, namely circuit complexity and the loss of space overhead. As mentioned previously, the LUTs may be updated during the execution of the graphics application in order to apply different interpolation calculations for different scaling operations. The LUTs 316 and 318 and the multiplexers 322 and 324 may be implemented in a variety of ways that would be apparent from those of ordinary skill in the art. Consequently, a detailed explanation of such has been omitted from herein in the interests of brevity.

The following example is provided merely to describe the operation of the scaling circuit 300, and should not be interpreted as limiting the scope of the present invention. The particular values provided in the following examples are selected to facilitate explanation, and should not be construed as being a preferred or particular embodiment of the present invention.

For the purposes of the present example, the LUTs 316 and 318 of the scaling circuit 300 have 32 entries, and the scaling circuit 300 uses 16-bit fractional coordinates (rU, rV) of the destination pixel's position as indices into the LUTs 316 and 318. Shift registers 310 and 312 are included in the scaling circuit 330 to receive the fractional coordinates rU and rV and left shift the fractional coordinates an appropriate number of bits to provide the index values into the LUTs 316 and 318. In the case of 32 entry LUTs and 16-bit fractional coordinates, the rU and rV values should be left shifted 11-bits. The remaining 5-bits are provided to multiplexers 322 and 324 to select one of the 32 entries in LUTs 316 and 318 (i.e., $2^5$=32, to select one of the 32 entries in the LUT). The selected values are then provided to the bilinear interpolation circuit 330 to generate the color of the destination pixel. Alternatively, the shift registers 310 and 312 may be omitted from the scaling circuit 300, and the multiplexers 322 and 324 could ignore the lower 11 bits of the fractional coordinates (rU, rV) and use the five most significant bits alone for indexing in the LUTs 316 and 318.

Figure 5:
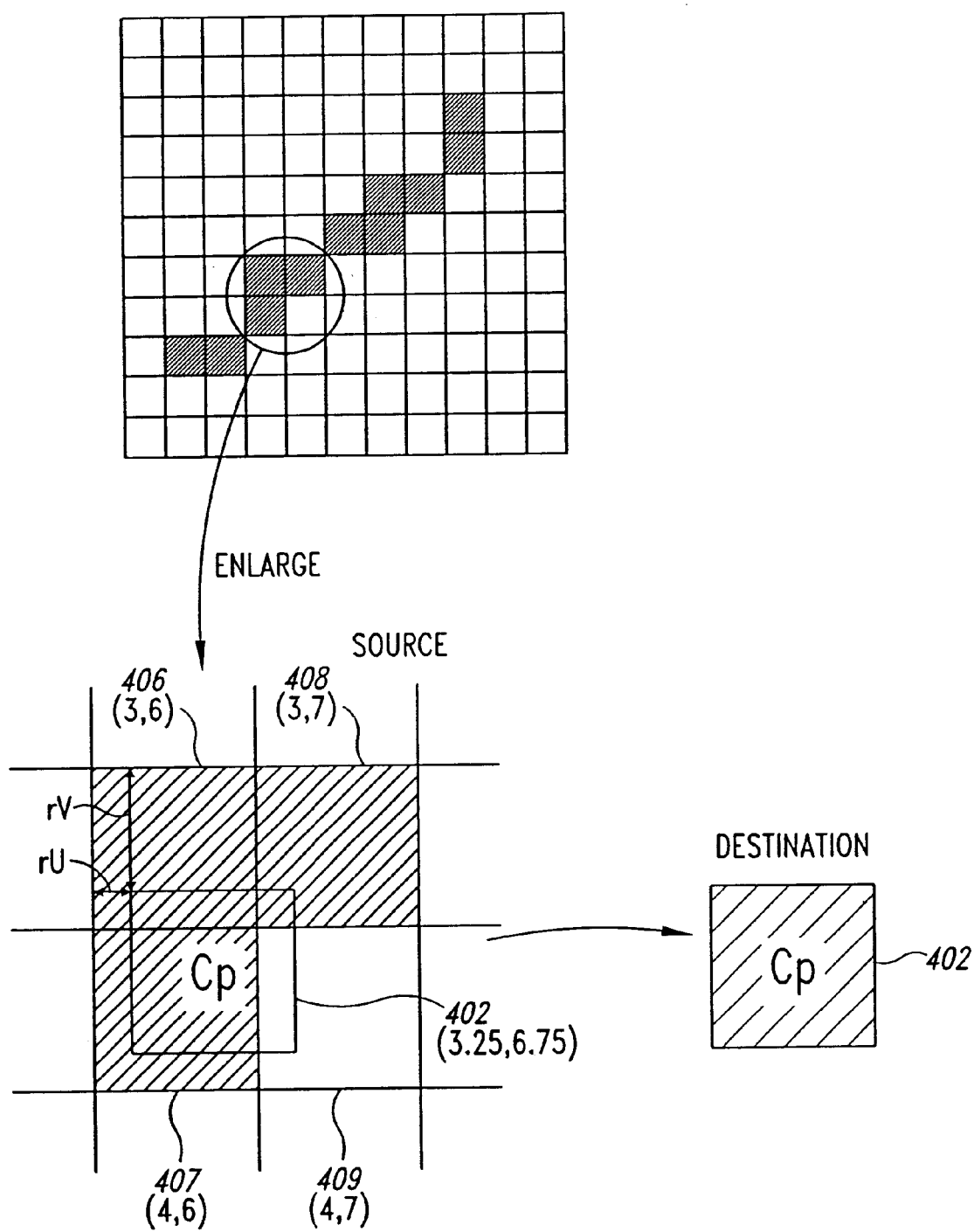
FIG. 5 is a diagram of adjacent source pixels and a destination pixel for which a scaling operation is performed.

Shown in FIG. 5 is an example where the color value Cp of destination pixel 402 to be calculated by the scaling circuit 300 (FIG. 4). As shown in FIG. 5, the destination pixel 402 is located at (3.25, 6.75) and does not coincide with any source pixel in the original image. Consequently, the destination pixel's color value Cp will be determined from the color value of the four source pixels adjacent to the destination pixel 402. That is, the four adjacent source pixels 406–409 from which the color value will be taken in the bilinear interpolation are t0 (3,6), t1 (3,7), t2 (4,6), and t3 (4,7).

As mentioned previously, the destination pixel's fractional coordinates (0.25, 0.75) are used as indices for the LUTs 316 and 318. When represented in binary, the fractional coordinate rU is 0100 0000 0000 0000, and the fractional coordinate rV is 1100 0000 0000 0000. The fractional coordinate rU is provided to the shift register 310 and left shifted 11 bits to produce 0 1000, or 8, and the fractional coordinate rV is provided to the shift register 312 and left shifted 11 bits to produce 1 1000, or 24. Consequently, the value stored in the eighth entry of LUT 316 and the value stored in the twenty-fourth entry of LUT 318 are provided to the bilinear interpolation circuit 330 for calculating the destination pixel color value.

The particular values stored in the entries of the LUTs 316 and 318 are programmed such that various interpolation functions may be simulated. As mentioned previously, programming of the values stored in the LUTs 316 and 318 may occur during the execution of a graphics application on the processor 104, or the graphics processor 204 in order to optimize the color value calculation of destination pixels for various graphics functions. With respect to the previous example, where a bilinear function is applied during interpolation, the value stored in the eighth entry of the LUT 316 should be 0.25 and the value stored in the twenty-fourth entry of the LUT 318 should be 0.75. The scaling circuit 300 may also be programmed to perform a form of bicubic interpolation by programming into the eighth entry of the LUT 316 and the twenty-fourth entry of the LUT 318 values such that when the values are provided to the bilinear interpolation circuit 330, the resulting color value Cp for the destination pixel simulates the results of bicubic interpolation.

From the foregoing it will be appreciated that, although specific embodiments of the invention have been described herein for purposes of illustration, various modifications may be made without deviating from the spirit and scope of the invention. For example, FIG. 4 illustrates LUTs 316 and 318 coupled to multiplexers 322 and 324, respectively, for selection of weighting values. However, the LUTs 316 and 318 may be implemented by using a memory device without multiplexers 322 and 324. That is, the index values based on the destination pixel's coordinates or fractional coordinates could be used as memory addresses for selection of weighting values stored in the memory device. Furthermore, rather than using two individual devices, as shown in FIG. 4, the LUTs 316 and 318 may be combined into a single memory device of sufficient capacity to store the weighting values for each coordinate. Accordingly, the invention is not limited except as by the appended claims.

What is claimed is:

1. An adaptive interpolation circuit for calculating an interpolated color value for a pixel, comprising:

first and second look-up-tables (LUTs), each LUT having a plurality of output terminals on which to provide a corresponding plurality of stored values;

first and second data selection circuits, each data selection circuit having a plurality of input terminals coupled to the plurality of output terminals of a respective LUT and an output terminal to selectively provide a selected one of the plurality of stored values from the respective LUT in accordance to a selection value, the first and second data selection circuits coupled to receive first and second coordinate values of the pixel, respectively, as the selection value; and an interpolation circuit having first and second input terminals coupled to the output terminal of a respective data selection circuit, the first selection circuit providing a first value f(rU) and the second selection circuit providing a second value f(rV), the interpolation circuit further having additional color input terminals to receive color values Ct0, Ct1, Ct2, and Ct3 from which the interpolated color value is calculated and an output terminal to provide the pixel's interpolated color value, the output value calculated according to the equation $Cp=[(1-f(rU))\cdot(1-f(rV))\cdot Ct0]+[f(rU)(1-f(rV))\cdot Ct1]+[(1-f(rU))\cdot f(rV)\cdot Ct2]+[f(rU)\cdot f(rV)\ Ct3]$.

2. The adaptive interpolation circuit according to claim 1 wherein the LUTs comprise registers.

3. The adaptive interpolation circuit according to claim 1, further comprising first and second shift registers coupled to the first and second selection circuits to shift the first and second coordinate values prior to providing the values as the selection value, all respectively.

4. The adaptive interpolation circuit according to claim 3 wherein the first and second coordinate values comprise fractional coordinate values.

5. The adaptive interpolation circuit according to claim 4 wherein each of the LUTs store 32 stored values.

6. The adaptive interpolation circuit according to claim 5 wherein the first and second fractional coordinate values comprise 16-bit values and the first and second shift registers left shift the first and second fractional coordinate values 11 bits.

7. The adaptive interpolation circuit according to claim 1 wherein the data selection circuits comprise multiplexers.

8. The adaptive interpolation circuit according to claim 1 wherein the interpolation circuit comprises a bilinear interpolation circuit.

9. The adaptive interpolation circuit according to claim 1 wherein the interpolation circuit comprises circuitry for calculating red, green, and blue color components for the destination pixel.

10. The adaptive interpolation circuit according claim 1 wherein the plurality of stored values stored in the first LUT are related according to a linear function, and the plurality of stored values stored in the second LUT are related according to a linear function.

11. The adaptive interpolation circuit according claim 1 wherein the plurality of stored values stored in the first LUT are related according to a cubic function, and the plurality of stored values stored in the second LUT are related according to a cubic function.

12. An adaptive interpolation circuit for calculating an interpolated color value for a pixel having first and second coordinate values from color values Ct0, Ct1, Ct2, and Ct3 of adjacent pixels, the adaptive interpolation circuit comprising:

first and second look-up-tables (LUTs) to store a plurality of values, each LUT having a selection circuit coupled to receive an index value corresponding to a respective coordinate value and an output terminal to provide a selected one of the plurality of stored values according to the received index value, the selection circuit of the first LUT providing a first selected value f(rU) and the selection circuit of the second LUT providing a second selected value f(rV); and an interpolation circuit having color input terminals to receive the color values of the adjacent pixels and first and second input terminals coupled to the output terminal of a respective LUT to receive the selected values f(rU) and f(rV), respectively, the interpolation circuit calculating the pixel's interpolated color value from the color values Ct0, Ct1, Ct2, and Ct3 of the adjacent pixels and the selected values from the first and second LUT according to the equation $Cp=[(1-f(rU))\cdot(1-f(rV))\cdot Ct0]+[f(rU)(1-f(rV))\cdot Ct1]+[(1-f(rU))\ f(rV)\cdot Ct2]+[f(rU)\cdot f(rV)\cdot Ct3]$.

13. The adaptive interpolation circuit of claim 12 wherein the selection circuit of the first and second LUTs comprise a multiplexer, each multiplexer having a plurality of input terminals coupled to the respective LUT and the output terminal to selectively provide a selected one of the plurality of stored values from the respective LUT in accordance to the respective index value.

14. The adaptive interpolation circuit of claim 12 wherein the interpolation circuit comprises a bilinear interpolation circuit.

15. The adaptive interpolation circuit according to claim 12 wherein the plurality of stored values stored by the first LUT are related according to a linear function, and the plurality of stored values stored by the second LUT are related according to a linear function.

16. The adaptive interpolation circuit according to claim 12 wherein the plurality of stored values stored by the first LUT are related according to a cubic function, and the plurality of stored values stored by the second LUT are related according to a cubic function.

17. The adaptive interpolation circuit according to claim 12, further comprising first and second shift registers coupled to the first and second LUTs to shift the first and second coordinate values prior to providing the values as the index value, all respectively.

18. The adaptive interpolation circuit according to claim 12 wherein the first and second LUTs each store 32 values.

19. A graphics processing system, comprising:

a bus interface for coupling to a system bus;

a graphics processor coupled to the bus interface to process graphics data;

address and data busses coupled to the graphics processor to transfer address and graphics data to and from the graphics processor;

display logic coupled to the data bus to drive a display; and an adaptive color interpolation circuit coupled to the graphics processor and the display logic to calculate an interpolated color value for a pixel having first and second coordinate values from color values Ct0, Ct1, Ct2, and Ct3 of adjacent pixels, the adaptive color interpolation circuit comprising:

first and second look-up-tables (LUTs) to store a plurality of values, each LUT having a selection circuit coupled to receive an index value corresponding to a respective coordinate value and an output terminal to provide a selected one of the plurality of stored values according to the received index value, the selection circuit of the first LUT providing a first selected value f(rU) and the selection circuit of the second LUT providing a second selected value f(rV); and an interpolation circuit having color input terminals to receive the color values of the adjacent pixels and first and second input terminals coupled to the output terminal of a respective LUT to receive the selected values f(rU) and f(rV), respectively, the interpolation circuit calculating the pixel's interpolated color value from the color values Ct0, Ct1, Ct2, and Ct3 of the adjacent pixels and the selected values from the first and second LUT according to the equation $Cp=[(1-f(rU))\cdot(1-f(rV))\cdot Ct0]+[f(rU)\cdot(1-f(rV))\cdot Ct1]+[(1+f(rU))\cdot f(rV)\cdot Ct2]+[f(rU)\cdot f(rV)\cdot Ct3]$.

20. The graphics processing system of claim 19 wherein the selection circuit of the first and second LUTs of the adaptive color interpolation circuit comprise a multiplexer, each multiplexer having a plurality of input terminals coupled to the respective LUT and the output terminal to selectively provide a selected one of the plurality of stored values from the respective LUT in accordance to the respective index value.

21. The graphics processing system of claim 19 wherein the interpolation circuit of the adaptive color interpolation circuit comprises a bilinear interpolation circuit.

22. The graphics processing system according to claim 19 wherein the plurality of stored values stored by the first LUT are related according to a linear function, and the plurality of stored values stored by the second LUT are related according to a linear function.

23. The graphics processing system according to claim 19 wherein the plurality of stored values stored by the first LUT are related according to a cubic function, and the plurality of stored values stored by the second LUT are related according to a cubic function.

24. The graphics processing system according to claim 19 wherein the adaptive color interpolation circuit further comprises first and second shift registers coupled to the first and second LUTs to shift the first and second coordinate values prior to providing the values as the index value, all respectively.

25. The graphics processing system according to claim 19 wherein the first and second LUTs of the adaptive color interpolation circuit each store 32 values.

26. A computer system, comprising:

a system processor;

a system bus coupled to the system processor;

a system memory coupled to the system bus; and a graphics processing system coupled to the system bus, the graphics processing system, comprising:

a bus interface for coupling to the system bus;

a graphics processor coupled to the bus interface to process graphics data;

address and data busses coupled to the graphics processor to transfer address and graphics data to and from the graphics processor;

display logic coupled to the data bus to drive a display; and an adaptive color interpolation circuit coupled to the graphics processor and the display logic to calculate an interpolated color value for a pixel having first and second coordinate values from color values Ct0, Ct1, Ct2, and Ct3 of adjacent pixels, the adaptive color interpolation circuit comprising:

first and second look-up-tables (LUTs) to store a plurality of values, each LUT having a selection circuit coupled to receive an index value corresponding to a respective coordinate value and an output terminal to provide a selected one of the plurality of stored values according to the received index value, the selection circuit of the first LUT providing a first selected value f(rU) and the selection circuit of the second LUT providing a selected value f(rV); and an interpolation circuit having color input terminals to receive the color values of the adjacent pixels and first and second input terminals coupled to the output terminal of a respective LUT to receive the selected values f(rU) and f(rV), respectively, the interpolation circuit calculating the pixel's interpolated color value from the color values Ct0, Ct1, Ct2, and Ct3 of the adjacent pixels and the selected values from the first and second LUT according to the equation $Cp=[(1-f(rU))\cdot(1-f(rV))\cdot Ct0]+[f(rU)\cdot(1-f(rV))\cdot Ct1]+[(1-f(rU))\cdot f(rV)\cdot Ct2]+[f(rU)\cdot f(rV)\cdot Ct3]$.

27. The computer system of claim 26 wherein the selection circuit of the first and second LUTs of the graphics processing system comprise a multiplexer, each multiplexer having a plurality of input terminals coupled to the respective LUT and the output terminal to selectively provide a selected one of the plurality of stored values from the respective LUT in accordance to the respective index value.

28. The computer system of claim 26 wherein the interpolation circuit of the graphics processing system comprises a bilinear interpolation circuit.

29. The computer system according to claims 26 wherein the plurality of stored values stored by the first LUT are related according to a linear function, and the plurality of stored values stored by the second LUT are related according to a linear function.

30. The computer system according to claim 26 wherein the plurality of stored values stored by the first LUT are related according to a cubic function, and the plurality of stored values stored by the second LUT are related according to a cubic function.

31. The computer system according to claim 26 wherein the graphics processing system further comprises first and second shift registers coupled to the first and second LUTs to shift the first and second coordinate values prior to providing the values as the index value, all respectively.

32. The computer system according to claim 26 wherein the first and second LUTs of the graphics processing system each store 32 values.

33. A method for calculating an interpolated color value for a destination pixel from color values Ct0, Ct1, Ct2, and Ct3 of source pixels adjacent to the destination pixel, the method comprising:

selecting a first resultant value f(rU) from a first plurality of resultant values based on a first coordinate of the destination pixel;

selecting a second resultant value f(rV) from a second plurality of resultant values based on a second coordinate of the destination pixel; and weighting the color values Ct0, Ct1, Ct2, and Ct3 of the source pixels adjacent to the destination pixel according to the equation Cp=[(1−f(rU))·(1−f(rV))·Ct0]+[f(rU)·(1−f(rV))·Ct1]+[(1−f(rU))·f(rV)·Ct2]+[f(rU)·f(rV)·Ct3].

34. The method of claim 33 wherein the first and second coordinates are fractional coordinates.

35. The method of claim 33 wherein the first plurality of resultant values comprises 32 resultant values and the second plurality of resultant values comprises 32 resultant values.

36. The method of claim 33 wherein selecting first and second resultant values comprises:

converting the respective coordinate value to an index; and indexing a respective look-up-table (LUT) according to the index value.

37. The method of claim 36 wherein converting the respective coordinate value to an index comprises left shifting the coordinate value eleven bits.

38. The method of claim 36 wherein the first plurality of resultant values are related according to a linear function and the second plurality of resultant values are related according to a linear function.

39. The method of claim 36 wherein the first plurality of resultant values are related according to a cubic function and the second plurality of resultant values are related according to a cubic function.

40. A method for calculating an interpolated color value for a destination pixel having first and second coordinates, the method comprising:

converting the first and second coordinates of the destination pixel into first and second indices;

selecting a first resultant value f(rU) from a first plurality of resultant values based on the first index;

selecting a second resultant value f(rV) from a second plurality of resultant values based on the second index; and calculating an interpolated color value for the destination pixel from color values Ct0, Ct1, Ct2, and Ct3 of source pixels adjacent to the destination pixel and the first and second resultant values f(rU) and f(rV), respectively, according to the equation Cp=[(1−f(rU))·(1−f(rV))·Ct0]+[f(rU)·(1−f(rV))·Ct1]+[(1−f(rU))·f(rV) Ct2]+[f(rU)·f(rV)·Ct3].

41. The method of claim 40 wherein the first plurality of resultant values comprises 32 resultant values and the second plurality of resultant values comprises 32 resultant values.

42. The method of claim 40 wherein selecting first and second resultant values comprises:

converting the respective coordinate value to an index; and indexing a respective look-up-table (LUT) according to the index value.

43. The method of claim 42 wherein converting the respective coordinate value to an index comprises left shifting the coordinate value eleven bits.

44. The method of claim 40 wherein the first plurality of resultant values are related according to a linear function and the second plurality of resultant values are related according to a linear function.

45. The method of claim 40 wherein the first plurality of resultant values are related according to a cubic function and the second plurality of resultant values are related according to a cubic function.

46. A method of determining an interpolated color value for a destination pixel as a function of both the colors Ct0, Ct1, Ct2, and Ct3 of a plurality of adjacent pixels and the location of the destination pixel relative to the location of the adjacent pixels, the method comprising:

storing a plurality of weighting values corresponding to a plurality of respective locations of the destination pixel relative to a plurality of possible locations of the adjacent pixels;

selecting weighting values f(rU) and f(rV) from the plurality based on the location of the destination pixel relative to the location of adjacent pixels; and determining the color value of the destination pixel as a function of the selected weighting values and the colors Ct0, Ct1, Ct2, and Ct3 of the adjacent pixels according to the equation Cp=[(1−f(rU))·(1−f(rV))·Ct0]+[f(rU)·(1−f(rV))·Ct1]+[(1−f(rU))·f(rV)·Ct2]+[f(rU)·f(rV)·Ct3].

47. The method of claim 46 wherein the plurality of weighting values are stored in a first and second look-up-table (LUT).

48. The method of claim 47 wherein selecting weighting values comprises:

converting coordinates defining the location of the destination pixel relative to the location of the adjacent pixels into a respective index value; and indexing a respective look-up-table (LUT) according to the index value.

49. The method of claim 46 wherein storing the plurality of weighting values comprises storing 32 weighting values.

50. The method of claim 46 wherein the plurality of weighting values are related according to a linear function.

51. The method of claim 46 wherein the plurality of weighting values are related according to a cubic function.

52. An adaptive interpolation circuit for calculating an interpolated color value for a pixel having first and second coordinate values from color values Ct0, Ct1, Ct2, and Ct3 of adjacent pixels, the adaptive interpolation circuit comprising:

first and second look-up-tables (LUTs) to store a plurality of values, each LUT having a selection circuit coupled to receive an index value corresponding to a respective coordinate value and an output terminal to provide a selected one of the plurality of stored values according to the received index value, the selection circuit of the first LUT providing a first selected value f(rU) and the selection circuit of the second LUT providing a second selected value f(rV); and a bilinear interpolation circuit receiving the color values Ct0, Ct1, Ct2, and Ct3 and having first and second input terminals coupled to a respective LUT to receive the selected values f(rU) and f(rV), the bilinear interpolation circuit using the first and second selected values f(rU) and f(rV), respectively, in weighting the color values Ct0, Ct1, Ct2, and Ct3 to bilinearly interpolate the interpolated color value for the pixel.

53. The adaptive interpolation circuit of claim 52 wherein the selection circuit of the first and second LUTs comprise a multiplexer, each multiplexer having a plurality of input terminals coupled to the respective LUT and the output terminal to selectively provide a selected one of the plurality of stored values from the respective LUT in accordance to the respective index value.

54. The adaptive interpolation circuit according to claim 52 wherein the plurality of stored values stored by the first LUT are related according to a linear function, and the plurality of stored values stored by the second LUT are related according to a linear function.

55. The adaptive interpolation circuit according to claim 52 wherein the plurality of stored values stored by the first LUT are related according to a cubic function, and the plurality of stored values stored by the second LUT are related according to a cubic function.

56. The adaptive interpolation circuit according to claim 52, further comprising first and second shift registers coupled to the first and second LUTs to shift the first and second coordinate values prior to providing the values as the index value, all respectively.

57. The adaptive interpolation circuit according to claim 52 wherein the first and second LUTs each store 32 values.

58. A method for calculating an interpolated color value for a destination pixel from color values Ct0, Ct1, Ct2, and Ct3 of source pixels, the method comprising:

selecting a first resultant value f(rU) from a first plurality of stored resultant values based on a first coordinate of the destination pixel relative to the positions of the source pixels;

selecting a second resultant value f(rV) from a second plurality of stored resultant values based on a second coordinate of the destination pixel relative to the positions of the source pixels; and bilinearly interpolating the color values Ct0, Ct1, Ct2, and Ct3 using the first and second resultant values f(rU) and f(rV), respectively, in weighting the color values Ct0, Ct1, Ct2, and Ct3 to calculate the interpolated color value for the destination pixel.

59. The method of claim 58 wherein the first and second coordinates are fractional coordinates.

60. The method of claim 58 wherein the first plurality of resultant values comprises 32 resultant values and the second plurality of resultant values comprises 32 resultant values.

61. The method of claim 58 wherein selecting first and second resultant values comprises:

converting the respective coordinate value to an index; and indexing a respective look-up-table (LUT) according to the index value.

62. The method of claim 61 wherein converting the respective coordinate value to an index comprises left shifting the coordinate value eleven bits.

63. The method of claim 61 wherein the first plurality of resultant values are related according to a linear function and the second plurality of resultant values are related according to a linear function.

64. The method of claim 61 wherein the first plurality of resultant values are related according to a cubic function and the second plurality of resultant values are related according to a cubic function.

* * * * *

UNITED STATES PATENT AND TRADEMARK OFFICE
CERTIFICATE OF CORRECTION

PATENT NO.   : 6,587,117 B1
DATED        : July 1, 2003
INVENTOR(S)  : Burton Wright and Lesley Borbely-Bartis It is certified that error appears in the above-identified patent and that said Letters Patent is hereby corrected as shown below:

Column 7,
Lines 37 & 38, reads "$Cp = [(1-f(rU)) \cdot (1-f(rV)) \cdot Ct0] + [f(rU)(1-f(rV)) \cdot Ct1] + [(1-f(rU)) \cdot f(rV) \cdot Ct2] + [f(rU) \cdot f(rV) Ct3]$." should read --$Cp = [(1-f(rU)) \cdot (1-f(rV)) \cdot Ct0] + [f(rU) \cdot (1-f(rV)) \cdot Ct1] + [(1-f(rU)) \cdot f(rV) \cdot Ct2] + [f(rU) \cdot f(rV) \cdot Ct3]$.--

Column 8,
Lines 30-32, reads "$Cp = [(1-f(rU)) \cdot (1-f(rV)) \cdot Ct0] + [f(rU)(1-f(rV)) \cdot Ct1] + [(1-f(rU)) \cdot f(rV) \cdot Ct2] + [f(rU) \cdot f(rV) Ct3]$." should read --$Cp = [(1-f(rU)) \cdot (1-f(rV)) \cdot Ct0] + [f(rU) \cdot (1-f(rV)) \cdot Ct1] + [(1-f(rU)) \cdot f(rV) \cdot Ct2] + [f(rU) \cdot f(rV) \cdot Ct3]$.--

Column 9,
Lines 28 & 29, reads "$Cp = [(1-f(rU)) \cdot (1-f(rV)) \cdot Ct0] + [f(rU)(1-f(rV)) \cdot Ct1] + [(1-f(rU)) \cdot f(rV) \cdot Ct2] + [f(rU) \cdot f(rV) Ct3]$." should read --$Cp = [(1-f(rU)) \cdot (1-f(rV)) \cdot Ct0] + [f(rU) \cdot (1-f(rV)) \cdot Ct1] + [(1-f(rU)) \cdot f(rV) \cdot Ct2] + [f(rU) \cdot f(rV) \cdot Ct3]$.--

Column 10,
Line 46, "claims 26" should read -- claim 26 --

UNITED STATES PATENT AND TRADEMARK OFFICE
CERTIFICATE OF CORRECTION

PATENT NO. : 6,587,117 B1
DATED : July 1, 2003
INVENTOR(S) : Burton Wright and Lesley Borbely-Bartis It is certified that error appears in the above-identified patent and that said Letters Patent is hereby corrected as shown below:

<u>Column 11,</u>
Lines 50-52, reads "$C_p = [(1-f(rU)) \cdot (1-f(rV)) \cdot Ct0] + [f(rU)(1-f(rV)) \cdot Ct1] + [(1-f(rU)) \cdot f(rV) \cdot Ct2] + [f(rU) \cdot f(rV) Ct3].$" should read --$C_p = [(1-f(rU)) \cdot (1-f(rV)) \cdot Ct0] + [f(rU) \cdot (1-f(rV)) \cdot Ct1] + [(1-f(rU)) \cdot f(rV) \cdot Ct2] + [f(rU) \cdot f(rV) \cdot Ct3].$--

Signed and Sealed this

Tenth Day of August, 2004

JON W. DUDAS
*Acting Director of the United States Patent and Trademark Office*